ary(12) United States Patent
Gehrke et al.

(10) Patent No.: US 8,825,743 B2
(45) Date of Patent: Sep. 2, 2014

(54) SEMANTIC TRANSACTIONS IN ONLINE APPLICATIONS

(75) Inventors: Johannes E. Gehrke, Ithaca, NY (US); Nitin Gupta, New Delhi (IN); Philipp T. Unterbrunner, Zurich (CH); Alan J. Demers, Ithaca, NY (US)

(73) Assignee: Cornell University, Ithaca, NY (US)

( * ) Notice: Subject to any disclaimer, the term of this patent is extended or adjusted under 35 U.S.C. 154(b) by 663 days.

(21) Appl. No.: 12/668,697

(22) PCT Filed: Jul. 11, 2008

(86) PCT No.: PCT/US2008/069840
§ 371 (c)(1),
(2), (4) Date: Feb. 1, 2010

(87) PCT Pub. No.: WO2009/009754
PCT Pub. Date: Jan. 15, 2009

(65) Prior Publication Data
US 2010/0198914 A1 Aug. 5, 2010

Related U.S. Application Data

(60) Provisional application No. 60/949,314, filed on Jul. 12, 2007, provisional application No. 60/970,693, filed on Sep. 7, 2007.

(51) Int. Cl.
*G06F 15/16* (2006.01)
*G06F 17/30* (2006.01)
*G06F 9/46* (2006.01)

(52) U.S. Cl.
CPC .......... *G06F 9/466* (2013.01); *G06F 17/30351* (2013.01); *G06F 17/30371* (2013.01)
USPC ........... 709/203; 707/612; 707/615; 707/623; 709/230; 463/42

(58) Field of Classification Search
None
See application file for complete search history.

(56) References Cited

U.S. PATENT DOCUMENTS

| 4,819,159 | A | | 4/1989 | Shipley et al. |
| 5,220,657 | A | * | 6/1993 | Bly et al. ...................... 711/152 |
| 5,524,239 | A | | 6/1996 | Fortier |
| 5,701,480 | A | | 12/1997 | Raz |
| 5,987,376 | A | * | 11/1999 | Olson et al. ................... 709/201 |
| 6,301,601 | B1 | * | 10/2001 | Helland et al. ............... 718/101 |
| 6,311,209 | B1 | * | 10/2001 | Olson et al. ................... 709/204 |
| 6,449,734 | B1 | * | 9/2002 | Shrivastava et al. ............ 714/15 |
| 6,671,686 | B2 | | 12/2003 | Pardon |
| 7,000,084 | B2 | * | 2/2006 | Binzinger ..................... 711/162 |
| 7,177,950 | B2 | * | 2/2007 | Narayan et al. ............... 709/248 |

(Continued)

OTHER PUBLICATIONS

IPER for PCT Application #: PCT/US2008/069840, Filed on Jul. 11, 2008, Applicant: Cornell Research Foundation, Inc.

(Continued)

*Primary Examiner* — Greg C Bengzon
(74) *Attorney, Agent, or Firm* — Burns & Levinson LLP; Jacob N. Erlich; Orlando Lopez

(57) ABSTRACT

A system and method for enabling distributed transaction processing by moving all application logic away from the server and into the client by using an optimistic concurrency control framework with client-side transaction validation including virtual full replication under a transactional programming model with full Atomicity, Consistency, Isolation, and Durability (ACID) properties.

18 Claims, 2 Drawing Sheets

(56) References Cited

U.S. PATENT DOCUMENTS

| | | | |
|---|---|---|---|
| 7,244,181 B2 | 7/2007 | Wang et al. | |
| 7,290,056 B1* | 10/2007 | McLaughlin, Jr. | 709/230 |
| 7,584,248 B2* | 9/2009 | Guo et al. | 709/205 |
| 7,720,992 B2* | 5/2010 | Brendle et al. | 709/237 |
| 7,765,186 B1* | 7/2010 | Hu et al. | 707/612 |
| 7,904,680 B2* | 3/2011 | Binzinger | 711/162 |
| 7,979,546 B2* | 7/2011 | Hamel et al. | 709/225 |
| 8,108,338 B2* | 1/2012 | Castro et al. | 707/610 |
| 2002/0091763 A1 | 7/2002 | Shah et al. | |
| 2003/0008712 A1 | 1/2003 | Poulin | |
| 2005/0209006 A1* | 9/2005 | Gatto et al. | 463/42 |
| 2006/0036709 A1* | 2/2006 | Baluja et al. | 709/217 |
| 2006/0142085 A1 | 6/2006 | Kim | |
| 2006/0258462 A1 | 11/2006 | Cheng et al. | |
| 2008/0010283 A1 | 1/2008 | Cornwell et al. | |
| 2008/0115121 A1* | 5/2008 | Douceur et al. | 717/168 |
| 2008/0248875 A1* | 10/2008 | Beatty | 463/42 |
| 2009/0112936 A1* | 4/2009 | Luitjens et al. | 707/201 |
| 2009/0275414 A1* | 11/2009 | Lee et al. | 463/42 |
| 2012/0072485 A1* | 3/2012 | Hutcheson et al. | 709/203 |

OTHER PUBLICATIONS

Shin et al., A Propagation of Virtual Space Information Using a Peer-to-peer Architecture for Massively Multiplayer Online Games, 2006, Proceedings of the 26th IEEE International Conference on Distributed Computing Systems Workshops (ICDCSW'06), ISBN 0/7695-2541-5/06.

Gardenghi et al., Design and Simulation of a Migration-based Architecture for Massiely Populated Internet Games, 2004, IEEE Communications Society Globecom 2004 Workshops, ISBM 0-7803-8798-8/04.

Gehrke, et al., U.S. Appl. No. 60/949,314, entitled System and Method for Efficient Transaction Processing in Online Data-Driven Applications, filed Jul. 12, 2007.

Gehrke, et al., U.S. Appl. No. 60/970,693, entitled System and Method for Efficient Transaction Processing in Online Data-Driven Applications, filed Sep. 7, 2007.

Douglas, et al., Enabling Massively Multi-Player Online Gaming Applications on a P2P Architecture, Dec. 15-18, 2005, Proceedings of the International Conference on Information and Automation, Colombo, Sri Lanka.

Bharambe et al., A Distributed Architecture for Interactive Multiplayer Games, Jan. 2005, School of Computer Science, Carnegie Mellow University, Pittsburgh, PA 15213, CMU-CS-05-112.

Ferretti, et al., An Optimistic Obsolescence-based Approach to Event Synchronization for Massively Multiplayer Online Games, 2007, International Journal of Computers and Applications, vol. 29, pp. 33-43, Department of Computer Science, University of Bologna, Mura Anteo Zamboni 7, 40127 Bologna, Italy.

Lee et al., ATLAS: A Scalable Network Framework for Distributed Virtual Environments, Apr. 2007, Collaborative Distributed Systems and Networks Laboratory Information and Communications University, 119 Munjiro, Yuseong-gu, Daejeon, 305-732, Korea, Presence, vol. 16, No. 2, 125-156, MIT.

International Search Report, International Application # PCT/US2008/069840, mailing date Jan. 30, 2009.

Eljas Solisalon-Soininen et al., Partial Strictness in Two-Phase Locking, 1995, Database Theory—ICDT '95, ISBN 978-3-540-58907-5, ISSN 0302-9743 (print) 1611-3349 (online) pp. 139-147.

Keiichi Endo et al., A Distributed Architecture for Massively Multiplayer Online Services with Peer-to-Peer Support, 2007, IFIP International Federation for Information Processing, vol. 229, Network Control and Engineering for QoS, Security, and Mobility, IV, ed. Gaiti, D, (Boston; Springer), pp. 147-158.

\* cited by examiner

SEMANTIC TRANSACTIONS IN ONLINE APPLICATIONS

CROSS REFERENCE TO RELATED APPLICATIONS

The present application is a U.S. national stage application under 35 U.S.C. 371 of International Application No. PCT/US08/69840 filed Jul. 11, 2008 and entitled SEMANTIC TRANSACTIONS IN ONLINE APPLICATIONS, which in turn claims priority to U.S. Provisional Application No. 60/949,314 filed Jan. 12, 2007 entitled System and Method for Efficient Transaction Processing in Online Data-Driven Applications, and U.S. Provisional Application No. 60/970,693 filed Sep. 7, 2007 entitled System and Method for Efficient Transaction Processing in Online Data-Driven Applications, which are incorporated herein in their entirety by reference for all purposes.

BACKGROUND

The system and method of the present embodiment relate generally to enabling distributed transaction processing, concurrency control, and replication therein.

Database systems form the core of a number of applications today. Current data-driven applications typically consist of multiple tiers—the user front end tier, the application logic tier, and the database tier. Of these, the user front end resides and executes at the client machine, whereas the application logic and the database transactions are typically processed at the server. This structure can render the client input/output intensive while the server is computation bound. For applications involving computationally intensive business logic, this structure can lead to a server computation overload, which can ultimately restrict the scalability of the application. Applications that support online collaborations, and therefore can require computationally expensive conflict detection, are typical examples.

For example, in an online game, the posed transaction could be as simple as moving one player from some coordinate to another coordinate. The game logic, in order to execute this transaction, may have to check for the presence of another object at the same coordinate. Furthermore, for three-dimensional games, the game logic may have to calculate the geometry of the object being moved and other objects in the vicinity to determine the success of this transaction. Such calculations could effectively limit the throughput of transactions at the application logic tier and impact the processing of transactions in a distributed manner.

One example of the use of distributed transaction processing is a Massively Multiplayer Online Game (MMOG) which is capable of supporting hundreds or thousands of players simultaneously, and is played on the Internet. The architecture that has evolved for these games typically involves a server cluster, anchored in a single geographic area or spread over numerous geographically distant locations, to which clients or user machines connect and play. In MMOGs, the game is typically simulated within a cluster of server machines, while game clients act as viewers and input terminals to the simulation. In the typical game, servers dynamically assign views to simulation servers, and the assigned simulation server checks out game objects from a database back-end, performs operations on the objects, and checks them back in. Thus a full replica of the game state is kept in the database back-end, and the full replica is accessed through a simulation layer. Parts of the virtual world can be statically or dynamically assigned to specific simulators. Client-to-simulator ratios average between 40-to-1 and 3-to-1, and there is typically a hard limit in terms of active players per "realm" (an instance of the game). On the other hand, in peer-to-peer gaming systems, protocols such as paxos, a family of protocols for solving consensus in a network of unreliable processors, or virtual synchrony, a method of data replication for sharing information among programs running on multiple machines connected over the interne, are used to enforce a total order of events and consistency across all participants.

This type of technology typically deals with different categories of data, including small volatile data such as object and player position, health, and money, and large static data such as textures, music, and 3D models. The former category of data can raise issues of consistency in a concurrent environment, whereas the latter can raise issues of content distribution. The small, volatile data associated with the game state can be more sensitive to latency than bandwidth restrictions.

What is needed is the addition of semantics to transactions at the application logic tier so as to allow the processing of transactions in a distributed manner, in particular resolving concurrency, consistency, and latency issues of previous systems.

SUMMARY

The needs set forth above as well as further and other needs and advantages are addressed by the embodiments set forth below.

In the present embodiment, a transaction can have four phases: tentative execution, integration, validation, and installation. In the tentative execution phase, the transaction is executed against local copies of objects, possibly generating tentative copies of objects. The tentative execution phase can generate an immutable, finite sequence of steps, terminated by either a commit or abort step. In the integration phase, the transaction is sent to the server which integrates it to the global log and returns some projection of the global log back to the client. The transaction is timestamped in this phase. In the validation phase, the transaction is validated with respect to the projection of the global log. Depending on the concurrency control method used, this may involve re-execution or the syntactic validation of a global schedule. Validation is performed at the clients. Thus, the client can enforce global consistency on local decisions, and can use any appropriate validation protocol. In the installation phase, the transaction's updates can be installed into a local, and optionally, global replica, if the validation phase is successful.

Clients can buffer local transactions and submit them to the server for integration in batches. The server can maintain a single master copy for each object. Synchronizing local and global replica, i.e. fetching object copies and installing updates, can be performed together with integration during a single handshake, without additional messages. Not all transactions have to be broadcast to all clients, and in the present embodiment there are algorithms that provide bounds on what actions each client executes while maintaining the semantics of the application.

The method of the present embodiment for enabling distributed transaction processing can include, but is not limited to including, the steps of (a) executing, at a client, a transaction against a local copy of objects, (b) generating tentative copies of objects if necessary, (c) committing or aborting the generated copies if necessary, (d) sending to a server the transaction, (e) timestamping the transaction, (f) integrating, at the server the transaction to a global log according to the transaction timestamp, (g) sending a projection of the global log to the client, (h) validating, at the client, the transaction with respect to the projection; and (i) installing any updates to the transaction into a local replica if said step of validating is successful. The method can further include the steps of combining a plurality of transactions into a schedule, and executing, at the client, the schedule according to the transaction timestamps.

The system of the present embodiment for enabling distributed transaction processing can include, but is not limited to including, a tentative execution processor for executing, at a client, a transaction against local copies of objects, and generating tentative copies of objects if necessary. The system can further include an integration processor for committing or aborting the tentative copies if necessary, sending to a server the transaction, timestamping the transaction, integrating, at the server, the timestamped transaction to a global log according to the transaction timestamp, and sending a projection of the global log to the client. The system can still further include a validation processor for validating, at the client, the transaction with respect to the projection, and an installation processor for installing any updates to the transaction into a local replica if the transaction is validated.

For a better understanding of the present embodiments, together with other and further objects thereof, reference is made to the accompanying drawings and detailed description.

DETAILED DESCRIPTION

The present embodiment is now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

In the present embodiment, there can be one central server and this server, together with the clients, form the distributed system. Since the server does not contain the application logic, conflict detection and synchronicity do not specifically require that there be exactly one server. The clients can contain application logic. Each possible transaction in the application can have a transaction handler in the client, and one or more transaction generators which are also present in the client. The transactions are annotated with semantics, semantics including a read set and a write set, including, such as position (or point of origin) in a game. The server can include a handler that uses these semantics to decide which client(s) execute the given transaction. Each transaction can specify a subset of the application state that can determine the execution characteristics of the transaction, given by the read set, and a subset of the application state that might be affected by the transaction. The server can maintain the sole version of the application state. A client can initiate a transaction and can send it to the server. The server, upon receiving a transaction, can send back to the same client an associated read set of the transaction. The client can execute this transaction and can return to the server a commit request along with the possibly modified write set. The server can update the application state using this write set.

In the present embodiment, while a client executes one transaction, the server might receive more transactions from, for example, other clients. In order to maximize throughput, the server does not need to send all uncommitted transactions to all of the clients. If a client initiates a transaction T, and the server sends back to the client the transaction T, along with other transactions $T_{set} = \{T_1, T_2 \ldots T_n\}$ where for all i, the write set of $T_i$ overlaps with the read set of T and $T_i$ is uncommitted. $T_{set}$ is the set of transactions that influence T. Since the server sends $T_i$ to the client, the server must also send it, for all i, the set of transactions that influence $T_i$. Abstracting this, the server must send back to the client the transitive closure of the set of all transactions influencing T. In order to execute all of the transactions that it receives, the client requires the read set for each of these transactions. The server therefore also sends to the client the transitive closure of the read set of all of these transactions.

Figure 1:
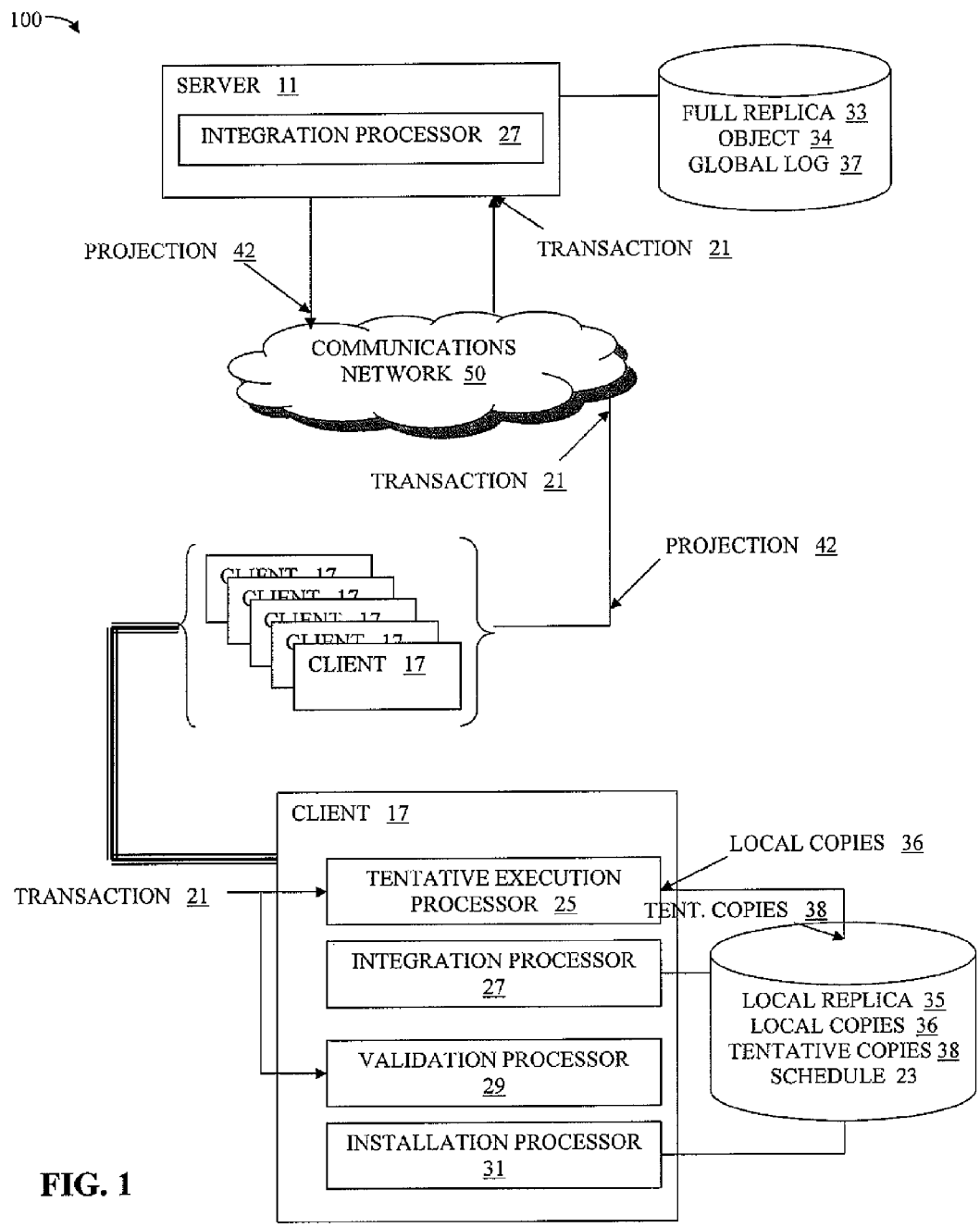
FIG. 1 is a schematic block diagram of the system of the present embodiment.

Referring now to FIG. 1, system 100 of the present embodiment can include, but is not limited to including, server 11 which can continuously operate, and can perform global event ordering. Server 11 can, for example, use atomic broadcast semantics, and can store a master copy of the dynamic (global) state in, for example, memory. System 100 can include, for example, thousands of clients 17 each of which contains application logic. In the present embodiment, each client 17 contains all application logic, making server 11 oblivious to application semantics.

Server 11 can include a database which can also be a server, such as, for example, MySQL, which can manage the physical organization and processing of data. Server 11 and the database may, for example, reside on the same physical machine. Clients 17 can connect to server 11 through a network protocol, such as, for example, TCP and HTTP. Server 11 can be a single point of contact between clients 17 and the database, and can therefore be responsible for the Atomicity, Consistency, Isolation, and Durability (ACID) properties of the application.

Although there are many types of transactions, the two types of transactions that are discussed herein are transactions initiated by a user front end and processed by client 17, and transactions initiated by an application that access the database. The latter transactions originate due to the execution of the former transactions. For example, moving a player in a game is a transaction initiated by a user front end, which checks for various constraints as discussed earlier. If successful, this transaction would result in a transaction initiated by an application, where the transaction updates the position of the player in the physical layer.

Clients 17 retain an optimistic view of the dynamic state organized by subject-based zones (auras). Under the aura model, clients 17 continuously read all objects within some geographical region (the aura) around their subject, for example, an avatar, and occasionally send update requests to server 11. An estimate is made of which objects will be accessed in the near future. In the example of an MMOG, activity can be managed by transactions 21. Each transaction 21 has a four-phase life-cycle managed by tentative execution processor 25, integration processor 27, validation processor 29, and installation processor 31.

Tentative execution processor 25 can manage the execution of transaction 21 in client 17 against local copies 36 of objects 34. Tentative execution processor 25 can also generate tentative copies 38 of objects 34 if necessary.

Integration processor 27 can commit or abort tentative copies 38 if necessary, send transaction 21 to server 11, timestamp transaction 21, integrate, at server 11, the timestamped transaction to global log 37 according to the transaction timestamp, and send projection 42 of global log 37 to client 17.

Validation processor 29 can certify reads and writes under certain conditions, such as are outlined in the following exemplary protocol, with respect to projection 42.

(1) A read $r_j(x_i)$ of $T_j$ is locally certified if and only if $T_i$ was issued by the same client as $T_j$ and has issued a commit request, or $T_i$ has committed;

(2) A write $w_j(x_j)$ of $T_j$ is locally certified if and only if (a) no write $w_k(x_k)$ with k>j has already been locally certified, and (b) no reads $r_k(x_i)$ where k>j have been locally certified already;

(3) A transaction is locally certified if it was issued by the validating client, and local certification for all its data operations succeeds, and a commit request step is encountered;

(4) A transaction is aborted locally if local certification for one of its data steps is rejected, or an abort step is encountered. If and only if the transaction is aborted because a step was rejected, and the validating client is the one who initiated the transaction, the client appends an abort step to the global schedule.

If the exemplary protocol above is followed, local abort and commit decisions are globally consistent, generated global schedules 43 can be multiversion view serializable, and can be recoverable. Committed writes can be installed into local replica 35. Optionally, committed writes can be installed in global (full) replica 33 at server 11. Further optionally, if client 17 fails before a commit or abort has been accomplished, server 11 can maintain a timer and issue aborts when the timer expires. To implement a failure procedure, client 17 can perform the exemplary protocol above if server 11 vetoes a commit. One possible way to implement timeouts, for example, is to give server 11 veto rights on every uncommitted transaction. If server 11 vetoes a transaction, server 11 appends an abort step to global schedule 23. In this case, client 17 cannot assume a local transaction actually commits, even if client 17 makes a commit decision. Instead, client 17 can propose commits and wait for server 11 to acknowledge commit decisions before making transaction durable. If server 11 vetoes any commit decision, client 17 should re-validate the projection of global schedule 23 that it received.

Installation processor 31 can allow clients 17 to see only their own transactions 21 and those of other clients 17 they directly observe, make local abort decisions for every transaction 21 they observe, make global abort and commit decisions for their own transactions 21, and append commit and abort operations to global log 37. In system 100, in the case when attributes of client 17 are static, for example, when client 17 is non-mobile, it is assumed that objects 34 are spatial, areas of perception and influence of client 17 are of constant extent, area of influence of client 17 is a sub-region of the area of perception, and the extents of the areas of perception and influence are the same for every client 17. An area of perception/influence is a multi-dimensional selection predicate that defines a superset of the read-set/write-set of any transaction 21 issued by client 17. Analogously, a client's area of influence defines a superset of any write-set of transactions issued by the client. For a transaction $T_i$ to influence another transaction $T_j$, where i<=j, $T_i$'s area of influence must overlap $T_j$'s area of perception. A client $C_i$ observes another client $C_j$ if and only if $C_i$'s area of perception overlaps Cis area of influence. The observes relation is reflexive and symmetric. If $C_i$ is the client executing transaction $T_j$, O is the set of clients in the reflexive and transitive closure of the observes relation for $C_i$ and $P=\Pi(L_G,O)$ is the projection of transactions 21 of global log 37 issued by any client 17 in O. A lower bound for P can be determined by, for example, calculating the smallest projection possible to guarantee consistency under certain protocols.

In the present embodiment, clients 17 can execute local transactions 21 against tentative snapshots, where later transactions 21 may read the tentative writes of previous, local transactions 21. This can be implemented by holding only a single copy of every object 34, and using partially strict 2-phase locking as described in *Partial Strictness in Two-Phase Locking*, E. Solsalon-Soininen and T. Ylouen, In *ICDT*, pages 139-147, 1995. The result is a partially strict monoversion schedule. The local schedule is then appended to the global schedule yielding a partially strict multiversion schedule that forms the input for the validation algorithm above. The committed writes are installed into local replicas 35, and execution resumes. Since uncommitted object versions written by remote clients are never read, remote dirty reads do not occur. Also, transactions issued by the same client cannot conflict (the local 2-phase lock protocol prevents that). Optionally, the corresponding checks can be omitted by the validation algorithm. In the present embodiment, client 17 can replicate a subset of the latest global snapshot, and clients 17 can receive a projection of the global log, tailored to the local snapshot they replicate.

To enable attribute changes in client 17, for example, to enable mobility for client 17, areas of perception and influence are associated with transactions 21 by defining the observes relation for transactions 21 and defining an area of reach around client 17. Server 11 can ensure that each client 17 receives a projection of global log 37 that includes all the remote transactions that are observed by the local transactions of client 17. In addition, when attributes of client 17 are changing, the set of locally replicated objects becomes dynamic, since client 17 can change its area of perception as its attributes change. After a handshake, client 17 needs the latest committed version of every object it may read before the next handshake. Because attributes of client 17 can change, the set of latest committed versions is a superset of the potential read-set of the attribute of client 17 right after the handshake. To keep this set of objects small, boundaries of attribute change are set for client 17, for example, positional boundaries for an avatar associated with client 17, beyond which the may not change until client 17 performs a handshake with server 11. These boundaries form a tuning parameter which determines the trade-off between pre-fetching and allowing attribute change.

In the following discussion, the theoretical underpinnings of transaction management are presented. In this discussion, a page model for data is assumed where objects are (object ID, value) pairs. If object ID=x, then the object can be referred to herein as "x". Further, a state S herein is a finite set of objects with distinct object IDs, and a snapshot $S_t$ of a state S is a state at a specific logical time t. Still further, a transaction as used herein is an atomic piece of application-specific code that includes data operations (e.g. object reads and writes), and control-flow statements. A transaction, for example, can be a finite sequence of object read r and write w steps (data steps) terminated by a commit c or abort a step (termination step). Executing a transaction T at a logical time t transforms one snapshot $S_t$ into another $S_{t+1}$. The "game" can therefore be viewed as a distributed discrete event simulation, where transactions are the atomic events. Still further, a log $L=(\lambda, \tau)$ is a pair of a (possibly infinite) set of transactions $L\lambda$, and a transaction timestamp function $L\tau$ converting $L\tau$ into logical time (natural numbers). For every pair of transactions $x,y \in L\cdot\lambda$, where $x \neq y$, $L\cdot\tau(x) \neq L\cdot\tau(y)$. Thus, $L\cdot\tau$ defines a total order between transactions in L·λ. There is one system-wide, infinite log, referred to herein as a global log $L_G$. $L_{G \cdot \tau}$ is a bijective mapping into logical time.

Infix and prefix functions can be defined as:

$$\text{infix}(L,t_0,t_e):=(\{x \in L \cdot \lambda | t_0 \leq L \cdot \tau(x) \leq t_e\}, L \cdot \tau)$$

$$\text{prefix}(L,t_e):=\text{infix}(L,0,t_e)$$

A projection function Π(L·S) takes a log L and a set of timestamps R, and returns a new log that consists of transactions whose timestamp is in R.

$$\Pi(L,R):=(\{x | x \in L \cdot \lambda \wedge L \cdot \tau(x) \in R\}, L \cdot \tau)$$

The projection function applied by server 11 during integration is the identity function on the current global log. In the present embodiment, server appends 11 transactions 21 submitted for integration to global log, i.e. it assigns timestamps in ascending order for example, by using a counter. In this case, a client beginning a handshake at logical time t will see prefix($L_G$,t+x) as its new local log, where x is the number of local transactions the client submits for integration. Replaying the local log from a consistent initial snapshot $S_0$ would result in a consistent snapshot $S_{t+x+1}$. In the present embodiment, the whole log is not replayed after every handshake, only infix($L_G$,u,v+x) to handshake, where u is the logical time the last handshake ended, v is the logical time the current handshake begins, and x is the number of transactions submitted for integration. In the present embodiment, clients joining at time t can be initialized by either sending them prefix($L_G$, t−1) or $S_t$.

In the present embodiment, a version ve of an object x is the logical time of the snapshot $S_{ve}$ the object is part of. Each data operation can be associated with a version. For a write operation $w_t(x_t)$, the version of both the operation and the object is simply the timestamp of the issuing transaction $T_t$. For read operations $r_t(x_t)$, the version of the operation, I, is the version of the issuing transaction, $T_t$, while the version of the object being read, vr, is the timestamp of the last transaction, $T_j$, that wrote the respective object. Since the timestamp of a transaction is not known during tentative execution, tentative versions of objects based on tentative timestamps of transactions can be used. The client can use, for example, an incrementing counter, starting at the logical time the last handshake with the server ended. During integration, the server can then map the (client ID, tentative version) pairs into globally unique versions with, for example, an offset calculation.

A multiversion schedule S=(s,ω, χ, v, <) is a 5-tuple of a (potentially infinite) set of data steps and termination steps s, an object function ω, a transaction function χ on s, a version function v or s, and a total ordering function < on s. Each step o∈s is uniquely associated with a transaction χ(o), and each data step is additionally associated with an object ω(o) and with a version v(o). Herein, $o_t(x_v)$ refers to a data step o on object ω(o)=x, where $L_G \cdot \tau(\chi(o))$=t and v(o)=v. $L_G \cdot \tau$ refers to the global log $L_G$ with its timestamp function τ on transactions.

In the present embodiment, there is one global schedule $S_G$ that contains every step of every transaction. A schedule as defined herein allows for interleaving of transactions, i.e. their respective steps are interleaved with respect to S·<. A projection function Π for a schedule S and a set of transactions R is as follows:

$$\Pi(S,R):=(\{x | x \in S \cdot s \wedge S \cdot \chi(x) \in R\}, S \cdot \omega, S \cdot \chi, S \cdot v, S \cdot <)$$

In a multiversion schedule, $T_v$ reads from another transaction $T_u$, if $T_u$ writes an object (version) $x_u$ that $T_v$ reads, and u<v, i.e. v appears before u in version order. Based on this definition, a reads-from graph can be built. A multiversion schedule is multiversion view serializable if and only if there exists a serial monoversion schedule with an identical reads-from graph, for the same set of transactions. A monoversion schedule is a special case of a multiversion schedule where each read operation reads the last written version of the respective object.

Figure 2:
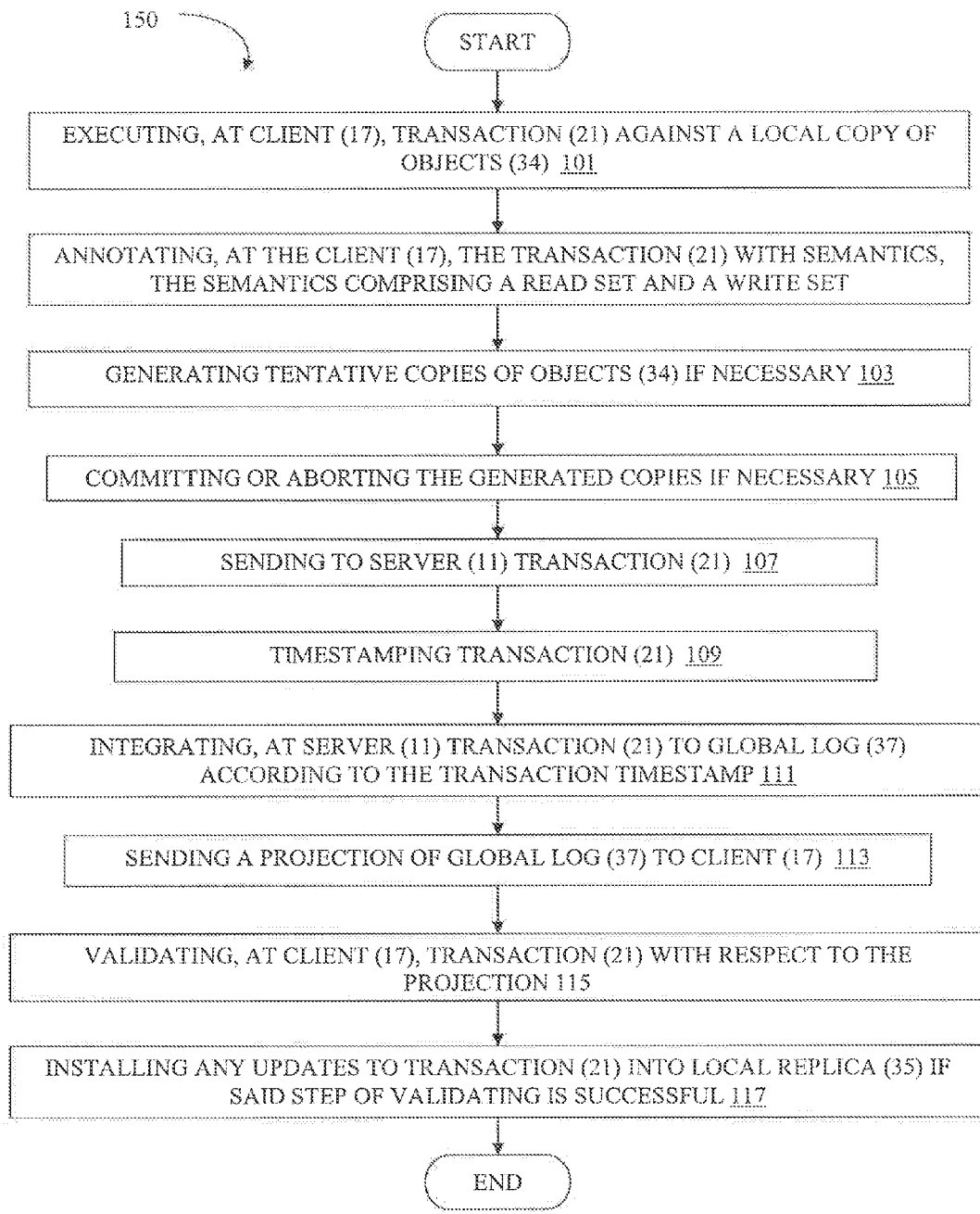
FIG. 2 is a flowchart of the method of the present embodiment.

Referring now primarily to FIG. 2, method 150 (FIG. 2) for enabling distributed transaction processing of the present embodiment can include, but is not limited to including, the steps of (a) executing, at client 17 (FIG. 1), transaction 21 (FIG. 1) against a local copy of objects 34 (FIG. 1), (b) generating tentative copies of objects 34 (FIG. 1) if necessary, (c) committing or aborting the generated copies if necessary, (d) sending to server 11 (FIG. 1) transaction 21 (FIG. 1), (e) timestamping transaction 21 (FIG. 1), (f) integrating, at server 11 (FIG. 1) transaction 21 (FIG. 1) to global log 37 (FIG. 1) according to the transaction timestamp, (g) sending a projection of global log 37 (FIG. 1) to client 17 (FIG. 1), (h) validating, at client 17 (FIG. 1), transaction 21 (FIG. 1) with respect to the projection, and (i) installing any updates to transaction 21 (FIG. 1) into local replica 35 (FIG. 1) if the step of validating is successful.

Referring primarily to FIG. 1, method 150 (FIG. 2) can optionally include the steps of combining a plurality of transactions 21 into schedule 23, and executing, at client 17, schedule 23 according to the transaction timestamps. In method 150, client 17 can be a plurality of clients 17. In method 150 (FIG. 2), the step of validating can include, but is not limited to including, the steps of: (j) locally certifying a read $r_j(x_i)$ of 27 if and only if $T_i$ was issued by the same one of the plurality of clients 17 as $T_j$, and if and only if $T_i$ has issued a commit request, or $T_i$ has committed; (k) locally certifying a write $w_j(x_j)$ of $T_j$ if and only if (I) no write $w_k(x_k)$ with k>j has already been locally certified, and (II) no reads $r_k(x_i)$ where k>j have been locally certified; (l) locally certifying transaction 21 if it was issued by the one of the plurality of clients 17 performing said step of validating, and said steps of locally certifying the read and locally certifying the write succeed, and a commit request is encountered; and (m) locally aborting transaction 21 if one of the steps of locally certifying the read or locally certifying the write is not successful, or the read or the write is aborted, wherein i, j, and k are times, $r_j(x_i)$ is defined as a read at time j of object x committed at time i, $T_i | T_j$ are transactions at times i and j, and $w_j(x_i)$ is defined as a write at time j of object x committed at time j.

Referring again primarily to FIG. 1, method 150 (FIG. 2) can still further optionally include the step of appending an abort step to schedule 23 if and only if transaction 21 is aborted because one of the steps (j)-(m) was not successful, and because client 17 performing the step of validation is one of the plurality of clients 17 that initiated transaction 21. Method 150 can further optionally include the step of sending transaction 21 to a subset of the plurality of clients 17. In method 150, attributes at least one of the plurality of clients 17 can change. Method 150 can even still further optionally include the steps of setting boundaries for attribute change of client 17 (FIG. 1), and performing steps (c)-(i) when client 17 (FIG. 1) is substantially close to the boundaries.

Method 150 (FIG. 2) can be, in whole or in part, implemented electronically. Signals representing actions taken by elements of system 100 (FIG. 1) can travel over electronic communications media. Control and data information can be electronically executed and stored on computer-readable media. System 100 (FIG. 1) can be implemented to execute on a node in communications network 50 (FIG. 1). Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, an EPROM, a FLASH-EPROM, or any other memory chip or cartridge, a carrier wave, or any other medium from which a computer can read.

Although the invention has been described with respect to various embodiments, it should be realized this invention is also capable of a wide variety of further and other embodiments.

What is claimed is:

1. A computer implemented method for enabling distributed transaction processing comprising the steps of:
   (a) executing, at a client, a transaction against a local copy of objects; the transaction occurring in a multiplayer online game;
   annotating, at the client, the transaction with semantics, the semantics comprising a read set, the read set being a subset of an application state that determines execution characteristics of the transaction, and a write set, the write set being a subset of the application state that can be affected by the transaction;
   (b) generating, at the client, tentative copies of the objects if necessary;
   (c) committing or aborting, at the client, the generated copies if necessary;
   (d) sending to a server the transaction, the transaction being timestamped at the server and integrated to a global log according to the transaction timestamp;
   (e) receiving, at the client, a projection of the global log;
   (f) validating, at the client, the transaction with respect to the projection; and
   (g) installing, at the client, any updates to the transaction into a local replica if said step of validating is successful;
   wherein application logic is located at the client; and
   wherein steps (a) through (g) are performed by one or more processors executing computer readable code embodied in non-transitory computer usable media.

2. The method as in claim 1 further comprising the steps of:
   combining a plurality of the transactions into a schedule; and
   executing, at the client, the schedule according to the transaction timestamps.

3. The method as in claim 1 wherein the client comprises a plurality of the clients.

4. A computer enabled method for enabling distributed transaction processing comprising the steps of:
   (a) executing, at a client, a transaction against a local copy of objects; the transaction occurring in a multiplayer online game;
   (b) generating, at the client, tentative copies of the objects if necessary;
   (c) committing or aborting, at the client, the generated copies if necessary;
   (d) sending to a server the transaction; the transaction being timestamped at the server and integrated to a global log according to the transaction timestamp;
   (e) receiving, at the client, a projection of the global log at the client;
   (f) validating, at the client, the transaction with respect to the projection; and
   (g) installing, at the client, any updates to the transaction into a local replica if said step of validating is successful;
   wherein application logic is located at the client; and
   wherein the client comprises a plurality of the clients; and
   wherein said step of validating comprises the steps of:
   (j) locally certifying a read $r_j(x_i)$ of $T_j$ if and only if $T_i$ was issued by the same one of the plurality of clients as $T_j$ and if and only if $T_i$ has issued a commit request, or $T_i$ has committed;
   (k) locally certifying a write $w_j(x_j)$ of $T_j$ if and only if (I) no write $w_k(x_k)$ with k>j has already been locally certified, and (II) no reads $r_k(x_i)$ where k>j have been locally certified;
   (l) locally certifying the transaction if it was issued by the one of the plurality of clients performing said step of validating, and said steps of locally certifying the read and locally certifying the write succeed, and a commit request is encountered; and
   (m) locally aborting the transaction if one of said steps of locally certifying the read or locally certifying the write is not successful, or the read or the write is aborted,
   wherein i, j, and k are times, $r_j(x_i)$ is defined as a read at time j of object x committed at time i, $T_i/T_j$ are transactions at times i and j, and $w_j(x_j)$ is defined as a write at time j of object x committed at time j; wherein steps (a) through (g) and (j) through (m) are performed by one or more processors executing computer readable code embodied in non-transitory computer usable media.

5. The method as in claim 4 further comprising the step of:
   appending an abort step to the schedule if and only if the transaction is aborted because one of said steps (j)-(m) was not successful, and because the client performing said step of validation is one of the plurality of clients that initiated the transaction.

6. The method as in claim 3 further comprising the step of:
   sending the transaction to a subset of the plurality of the clients.

7. The method as in claim 3 wherein at least one attribute of one of the plurality of clients can change.

8. The method as in claim 7 further comprising the step of:
   setting boundaries for the change of the at least one attribute of the client and
   performing steps (c)-(i) when the client is substantially close to the boundaries.

9. A system for enabling distributed transaction processing comprising:
   one or more clients, each client comprising:
   a tentative execution processor machine component configured for
      executing a transaction against local copies of objects; the transaction occurring in a multiplayer online game;
      annotating the transaction with semantics, the semantics comprising a read set, the read set being a subset of an application state that determines execution characteristics of the transaction, and a write set, the write set being a subset of the application state that can be affected by the transaction; and
      generating tentative copies of said objects if necessary;
   an integration processor machine component configured for
      committing or aborting said tentative copies if necessary;
      sending to a server said transaction
   a validation processor machine component configured for
      validating, at said client, said transaction with respect to said projection and
   an installation processor machine component configured for installing any updates to said transaction into a local replica if said transaction is validated; and
   a server comprising another integration processor machine component configured for
timestamping said transaction;
integrating, at said server, the timestamped transaction to a global log according to the transaction timestamp; and
sending a projection of said global log to said one or more clients;
wherein application logic is located at each one of said one or more clients; and
wherein the tentative execution processor, the integration processor, the validation processor and the installation processor are configured for executing recited functions by control information stored in non-transitory computer readable media.

10. The system as in claim 9 wherein said tentative execution processor machine component is further configured for:
combining a plurality of said transactions into a schedule; and
executing, at said client said schedule according to the transaction timestamps.

11. A system for enabling distributed transaction processing comprising:
a tentative execution processor machine component configured for
executing, at a client, a transaction against local copies of objects; the transaction occurring in a multiplayer online game; and
generating tentative copies of said objects if necessary;
an integration processor machine component configured for
committing or aborting said tentative copies if necessary;
sending to a server said transaction;
timestamping said transaction;
integrating, at said server, the timestamped transaction to a global log according to the transaction timestamp; and
sending a projection of said global log to said client;
a validation processor machine component configured for
validating, at said client, said transaction with respect to said projection; and
an installation processor machine component configured for installing any updates to said transaction into a local replica if said transaction is validated;
wherein said client includes a plurality of said clients;
wherein the tentative execution processor, the integration processor, the validation processor machine component and the installation processor machine component are configured for executing computer readable code embodied in non-transitory computer usable media, and
wherein said validation processor machine component is further configured to:

(j) locally certifying a read $r_j(x_i)$ of $T_j$ if and only if $T_i$ was issued by the same one of said plurality of said clients as $T_j$ and if and only if $T_i$ has issued a commit request, or $T_i$ has committed;
(k) locally certifying a write $w_j(x_j)$ of $T_j$ if and only if (I) no write $w_k(x_k)$ with k>j has already been locally certified, and (II) no reads $r_k(x_i)$ where k>j have been locally certified;
(l) locally certifying said transaction if it was issued by the one of the plurality of clients performing said step of validating, and said steps of locally certifying said read and locally certifying said write succeed, and a commit request is encountered; and
(m) locally aborting said transaction if one of said steps of locally certifying said read or locally certifying said write is not successful, or said read or said write is aborted,
wherein i, j, and k are times, $r_j(x_i)$ is defined as said read at time j of object x committed at time i, $T_i/T_j$ are transactions at times i and j, and $w_j(x_j)$ is defined as said write at time j of object x committed at time j.

12. The system as in claim 11 wherein said validation processor machine component is further configured to:
appending an abort step to said schedule if and only if said transaction is aborted because one of said steps (j)-(m) was not successful, and because said client executing said validation processor is one of said plurality of said clients that initiated said transaction.

13. The system as in claim 9 wherein said another integration processor machine component is further configured for:
sending said transaction to a subset of said one or more clients.

14. The system as in claim 9 wherein attributes of at least one of said one or more clients can change.

15. The system as in claim 14 wherein said tentative execution processor machine component is further configured for:
setting boundaries for said change of said attributes of said client; and
invoking said integration processor, said validation processor, and said installation processor when said client is substantially close to said boundaries.

16. A physical node equipment in a communications network configured for carrying out the method of claim 1; the method being carried out by the node in the communications network executing computer readable code embodied in non-transitory computer usable media.

17. A communications network having a physical node equipment configured for carrying out the method of claim 1; the method being carried out by the node in the communications network executing computer readable code embodied in non-transitory computer usable media.

18. A non-transitory computer readable medium having instructions for carrying out the method of claim 1.

* * * * *

UNITED STATES PATENT AND TRADEMARK OFFICE
CERTIFICATE OF CORRECTION

| | | |
|---|---|---|
| PATENT NO. | : 8,825,743 B2 | Page 1 of 1 |
| APPLICATION NO. | : 12/668697 | |
| DATED | : September 2, 2014 | |
| INVENTOR(S) | : Johannes E. Gehrke et al. | |

It is certified that error appears in the above-identified patent and that said Letters Patent is hereby corrected as shown below:

In the Claims

In column 11, line 21 (claim 10), "at said client said" should read -- at said client, said --

Signed and Sealed this
Sixteenth Day of December, 2014

Michelle K. Lee
*Deputy Director of the United States Patent and Trademark Office*